(12) United States Patent
Kim et al.

(10) Patent No.: US 9,313,101 B2
(45) Date of Patent: Apr. 12, 2016

(54) METHOD OF CONTROLLING TRAFFIC BY TIME-BASED POLICY

(71) Applicant: Electronics and Telecommunications Research Institute, Daejeon (KR)

(72) Inventors: Sang Wan Kim, Daejeon (KR); Joon Kyung Lee, Daejeon (KR); Dong Won Kang, Daejeon (KR); Wang Bong Lee, Daejeon (KR); Sang Kil Park, Daejeon (KR); SangSik Yoon, Daejeon (KR); Jong Dae Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 127 days.

(21) Appl. No.: 13/645,090

(22) Filed: Oct. 4, 2012

(65) Prior Publication Data

US 2013/0281075 A1      Oct. 24, 2013

(30) Foreign Application Priority Data

Apr. 18, 2012   (KR) .................. 10-2012-0040556

(51) Int. Cl.
*H04M 3/00*  (2006.01)
*H04L 12/24*  (2006.01)

(52) U.S. Cl.
CPC ................. *H04L 41/0893* (2013.01)

(58) Field of Classification Search
CPC ..... H04W 24/00; H04W 8/245; H04W 72/00; H04L 47/10; H04L 47/12; H04L 47/15; H04L 47/22; H04L 47/125; H04L 12/5695
USPC .............. 455/418, 419, 453; 370/230, 230.1, 370/392, 395.2, 443, 468, 471
See application file for complete search history.

(56) References Cited

U.S. PATENT DOCUMENTS

| | | | |
|---|---|---|---|
| 6,859,841 B2 * | 2/2005 | Narad et al. .................. | 709/236 |
| 7,853,678 B2 | 12/2010 | Khemani et al. | |
| 2008/0225708 A1 | 9/2008 | Lange | |
| 2008/0316922 A1 * | 12/2008 | Riddle et al. .................. | 370/230 |
| 2013/0117847 A1 * | 5/2013 | Friedman et al. ............... | 726/22 |

FOREIGN PATENT DOCUMENTS

KR    2003-0003593    1/2003

* cited by examiner

*Primary Examiner* — Temica M Beamer
(74) *Attorney, Agent, or Firm* — Nelson Mullins Riley & Scarborough LLP

(57) ABSTRACT

A method of controlling traffic, particularly, a method of setting and executing a traffic control policy in which a time condition is additionally combined is provided. At any specific step of a network that executes a time-based policy, an execution time point of the time-based policy can be determined. Further, a network service provider can provide various application services to a network user using a time-based policy.

6 Claims, 4 Drawing Sheets

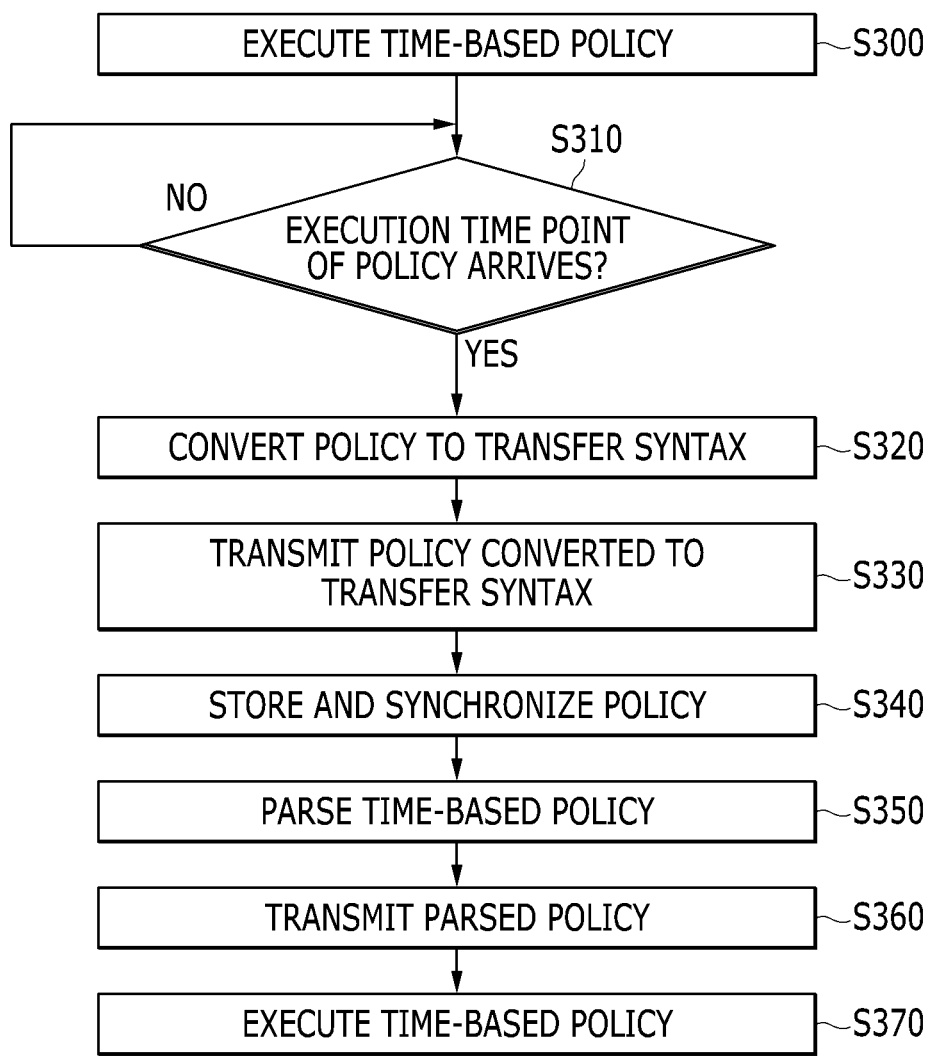

METHOD OF CONTROLLING TRAFFIC BY TIME-BASED POLICY

CROSS-REFERENCE TO RELATED APPLICATION

This application claims priority to and the benefit of Korean Patent Application No. 10-2012-0040556 filed in the Korean Intellectual Property Office on Apr. 18, 2012, the entire contents of which are incorporated herein by reference.

BACKGROUND OF THE INVENTION (a) Field of the Invention

The present invention relates to a method of controlling traffic. More particularly, the present invention relates to a method of setting a traffic control policy in which a time condition is added as a condition that controls traffic and of determining and executing an execution time point of a preset time-based policy.

(b) Description of the Related Art

Traffic generally indicates a load that is applied to a communication apparatus or a system, and in a network, traffic indicates a quantity of data that are exchanged through the network. In order to provide a smooth network service or to apply a reasonable accounting model, a service provider monitors and controls a traffic situation. In this case, a policy is set to operate a network, and when transmission of data is requested from the outside of a server through the network, a service provider controls traffic according to the set policy.

Such traffic includes a packet in which information such as a 5-tuple (source IP address, destination IP address, source port, destination port, and protocol) and a 7-tuple (source IP address, destination IP address, source port, destination port, protocol, input port number, and signature) is stored, and a general policy is set based on information such as a 7-tuple that is included in a packet of traffic. A policy that is set at a policy server is executed in a policy execution point (PEP) and controls traffic.

Conventionally, because the above policy was set using only information that is included in a packet within traffic, a condition combination for setting a policy was limited to the information, and thus there was a limitation in controlling traffic with various methods.

SUMMARY OF THE INVENTION

The present invention has been made in an effort to provide a method of controlling traffic having advantages of controlling traffic with various methods by adding a time condition to policy setting that controls traffic and suggesting a method of executing a time-based policy in each stage of a network.

An exemplary embodiment of the present invention provides a method of setting a time-based policy that controls traffic. The method includes: extracting at least one of tuple information that is included in a packet; setting a time condition; and setting a time-based traffic control policy by combining the set time condition and the at least one tuple information that is included in the extracted packet.

Another embodiment of the present invention provides a method of executing a time-based policy in a policy server stage of a network. The method includes: determining, by a policy server (PS) to which the policy is set, whether an execution time point of the time-based policy arrives; continuing, if an execution time point of the time-based policy does not arrive, to determine an execution time point of the time-based policy; and transmitting, if an execution time point of the time-based policy arrives, the time-based policy to a policy management system (PMS), wherein the PMS is connected to policy execution equipment (PEE) that executes the time-based policy.

The method may further include converting, by the PS, the policy to PMS transfer syntax and transmitting the PMS transfer syntax to the PMS.

Yet another embodiment of the present invention provides a method of executing a time-based policy in a PMS stage in a network. The method includes: downloading, by a PMS that is connected to a PEE that executes the time-based policy, the time-based policy; storing the time-based policy at a database that is included in the PMS; determining whether an execution time point of the time-based policy arrives; continuing, if an execution time point of the time-based policy does not arrive, to determine an execution time point of the time-based policy; and transmitting, if an execution time point of the time-based policy arrives, the time-based policy to the PEE.

The method may further include parsing, by the PMS, the time-based policy to a structure that is appropriate for the PEE.

The method may further include synchronizing a time-based policy that is stored at the PMS with the downloaded time-based policy.

Yet another embodiment of the present invention provides a method of executing a time-based policy in a PEE of a network. The method include: downloading, by a PEE that executes the time-based policy, the policy; determining whether an execution time point of the time-based policy arrives; continuing, if an execution time point of the time-based policy does not arrive, to determine an execution time point of the time-based policy; and executing, if an execution time point of the time-based policy arrives, the time-based policy.

BRIEF DESCRIPTION OF THE DRAWINGS

FIG. 4 is a flowchart illustrating a method of executing a time-based policy in a policy server stage of a network according to an exemplary embodiment of the present invention.

DETAILED DESCRIPTION OF THE EMBODIMENTS

Figure 1:
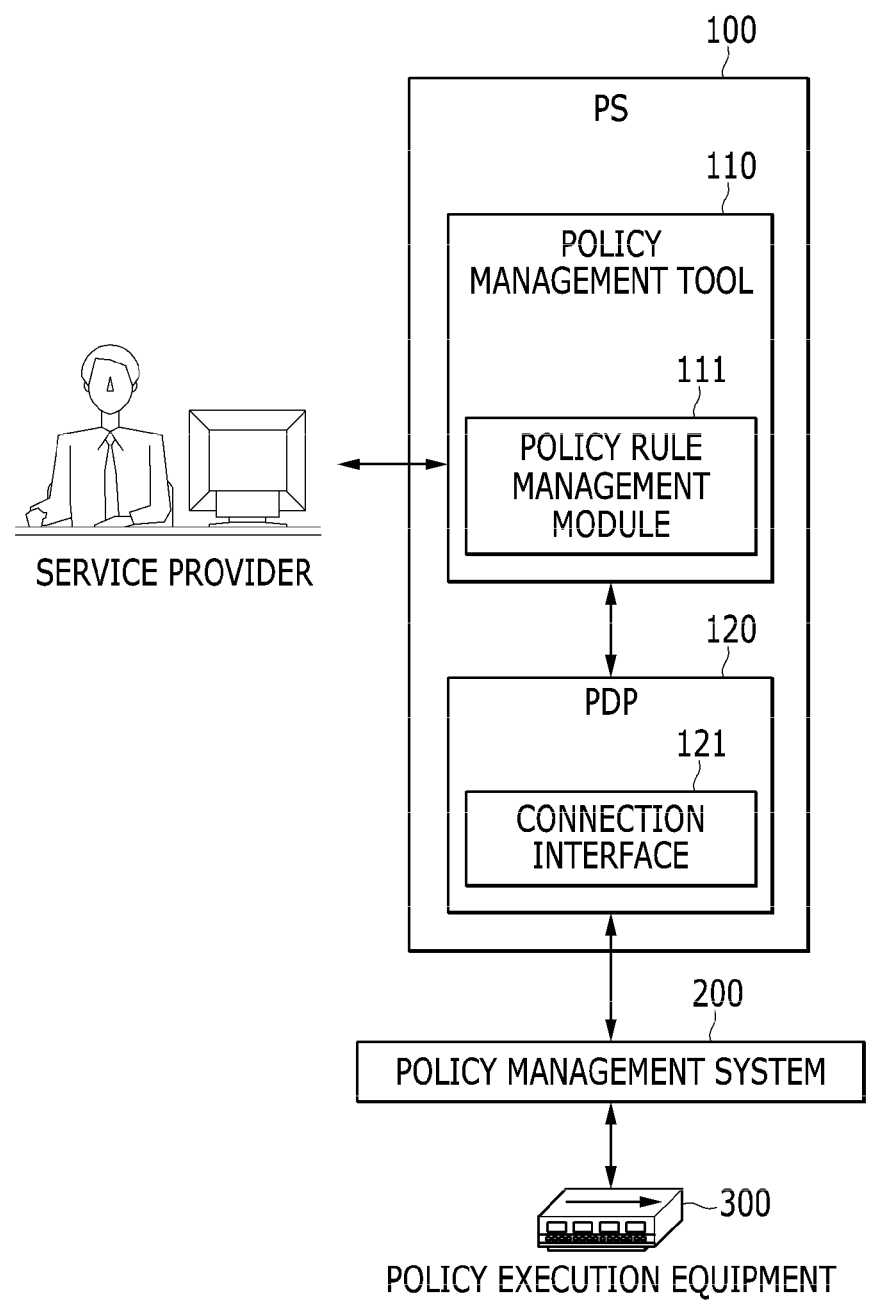
FIG. 1 is a diagram illustrating a system that executes a time-based policy according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

Hereinafter, a method of controlling traffic through a time-based policy according to an exemplary embodiment of the present invention will be described in detail with reference to the drawings.

FIG. 1 is a diagram illustrating a system that executes a time-based policy according to an exemplary embodiment of the present invention.

Referring to FIG. 1, a time-based policy is set at a policy server (PS) 100 and is executed in policy execution equipment (PEE) 300 via a policy management system (PMS) 200.

A network service provider first connects to a policy management tool 110 and sets a time-based policy using a policy rule management module 111.

A policy that is set in this case is set by combining information (5-tuple, 7-tuple, etc.) that is included in a packet, a traffic flow form, and a time condition. That is, by combining a kind of tuple data that are included in the packet, a traffic pattern, and a time condition, a time-based policy may be set.

For example, in a specific time zone, a policy that allows traffic of a specific IP address may be set, and during a specific period, a policy that determines total traffic that uses a specific port or address may be set. In this way, as a time condition is reflected to policy setting that controls traffic, a policy may be subdivided and diversified.

The time-based policy that is set at the policy rule management module 111 is converted to policy management system transfer syntax at a policy decision point (PDP) 120, and the policy management system transfer syntax is transmitted to the policy management system (PMS) 200.

The PMS 200 is connected to the PEE 300, which is hardware that executes a policy that controls traffic, and is a software step of a network.

Conversion to PMS transfer syntax may be performed in a connection interface 121 of the PDP 120. The PMS 200 stores the received time-based policy at a database and synchronizes the time-based policy in real time.

The PMS 200 parses the received time-based policy to a structure appropriate for the PEE 300, and transmits the parsed time-based policy to each PEE 300.

In this case, a plurality of PEEs 300 may be connected to the PMS 200, and the PEE 300 may become various network equipment according to a location at which a corresponding time-based policy of a network is executed, a type of a network, or a network providing vender.

Thereafter, as the time-based policy is executed in the PEE 300, a time condition is reflected to a traffic control and thus a related application service can be provided.

Figure 2:
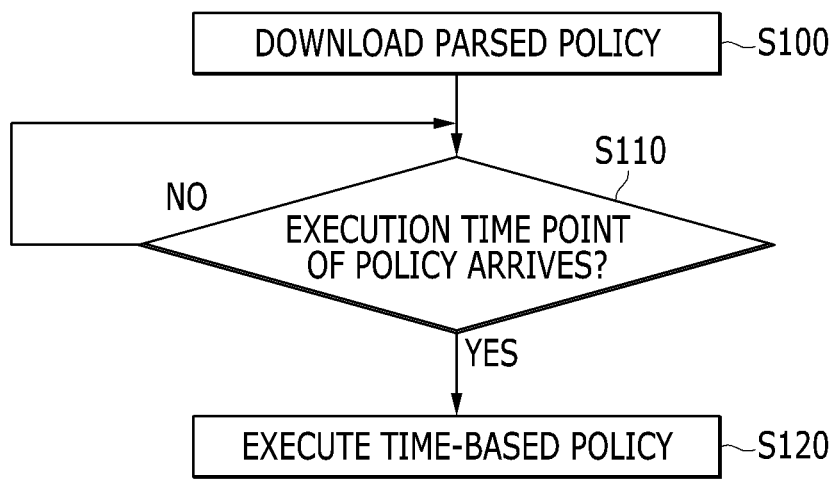
FIG. 2 is a flowchart illustrating a method of executing a time-based policy in a policy execution equipment stage of a network according to an exemplary embodiment of the present invention.
Figure 3:
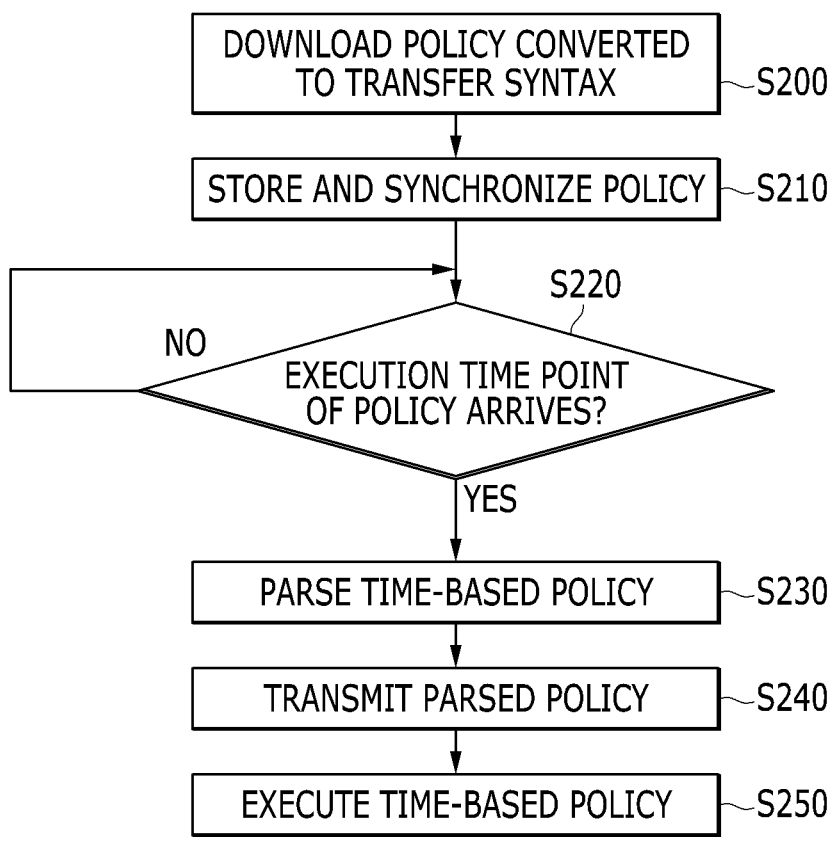
FIG. 3 is a flowchart illustrating a method of executing a time-based policy in a policy management system stage of a network according to an exemplary embodiment of the present invention.

An execution time point of a time-based policy to which a time condition is reflected may be determined at each stage of the system. FIGS. 2 to 4 are flowcharts illustrating a method of executing a time-based policy in each stage of a network system in which a time-based policy is executed according to an exemplary embodiment of the present invention.

FIG. 2 is a flowchart illustrating a method of executing a time-based policy in a PEE stage of a network according to an exemplary embodiment of the present invention.

Referring to FIG. 2, the PEE 300 downloads a time-based policy that is parsed from the PMS 200 (S100).

As shown in FIG. 1, the time-based policy is set at the PS 100, is converted to PMS transfer syntax to be transmitted to the PMS 200, and is parsed appropriately for each PEE 300 in the PMS 200. Thereafter, the PEE 300 analyzes the time-based policy and determines whether an execution time point of the time-based policy has arrived (S110).

If an execution time point of the time-based policy does not arrive, the PEE 300 continues to determine an execution time point of the time-based policy. If an execution time point of the time-based policy arrives, the PEE 300 executes the time-based policy (S120).

As described above, according to an exemplary embodiment of the present invention, when the PEE 300 determines an execution time point of the time-based policy, an execution time point is determined in an execution stage of a policy of a network system, and thus the time-based policy can be rapidly executed without a delay time from a determination time point of the time-based policy.

However, because the PEE 300 is hardware, in order to perform the above method, a function that can determine an execution time point of a time-based policy should be loaded when producing hardware, or a corresponding function should be additionally loaded through upgrade of firmware. Further, even if a function that can determine an execution time point of a time-based policy is loaded, an execution time point of the time-based policy should be monitored in real time and thus performance may be deteriorated with consumption of hardware resources.

Therefore, in a general-purpose PEE 300 in which the function is not loaded, when it is necessary to execute a time-based policy, or when available resources do not fully exist in the hardware, an execution time point of the time-based policy should be determined in a higher level stage than that of the PEE 300 of a time-based policy execution system.

Hereinafter, a method of determining an execution time point of a time-based policy at a PS stage or a PMS stage will be described with reference to FIGS. 3 and 4.

FIG. 3 is a flowchart illustrating a method of executing a time-based policy in a PMS stage of a network according to an exemplary embodiment of the present invention.

Referring to FIG. 1, in a system in which a time-based policy is executed, the PMS 200 is in a higher level stage than that at which the PEE 300 is positioned, and is in a software-based stage.

Referring to FIG. 3, the PMS 200 downloads a time-based policy that is converted to PMS transfer syntax from the PS 100 (S200).

In this case, as shown in FIG. 1, a policy may be set at the policy management tool 110 of the PS 100 by a network service provider, the PDP 120 may transmit the policy to the PMS 200, and the connection interface 121 of the PDP 120 may convert the time-based policy to the PMS transfer syntax.

The PMS 200 stores the downloaded time-based policy at a database, and synchronizes the stored time-based policy (S210).

Next, the PMS 200 determines whether an execution time point of the time-based policy arrives (S220). If an execution time point of the time-based policy does not arrive, the PMS 200 continues to determine an execution time point of the time-based policy.

If an execution time point of the time-based policy arrives, in order to execute the time-based policy in the PEE 300, the PMS 200 parses the time-based policy to a structure that is appropriate for each PEE 300 (S230).

In this case, parsing of a time-based policy may be performed earlier than step S220 of determining whether an execution time point of the time-based policy arrives, and in this case, the parsed time-based policy may be stored at a separate storage space, and when an execution time point of the policy arrives, the policy may be transmitted to the PEE 300.

That is, after a time-based policy is first parsed by the PMS 200 to a structure that is appropriate for the PEE 300 to execute the time-based policy, the PMS 200 may determine an execution time point of the time-based policy.

The PMS 200 transmits the parsed time-based policy in which an execution time point arrives to the PEE 300 (S240).

Thereafter, the PEE 300 executes the time-based policy (S250).

At the software step of the PMS 200, i.e., a system that executes the time-based policy, an execution time point of the time-based policy may be determined through the above process.

In this case, because an execution time point of the time-based policy is determined in a higher level stage than that of a point at which the policy is executed, after some time delay from the execution time point, the policy may be executed in the PEE 300.

However, a problem of time delay can be solved by setting an environment to determine a time point that is somewhat earlier than an execution time point of a time-based policy as an execution time point in consideration of a time that is parsed to a structure that is appropriate for the PEE 300 or a time to transmit a parsed policy to the PEE 300.

FIG. 4 is a flowchart illustrating a method of executing a time-based policy in a PS stage of a network according to an exemplary embodiment of the present invention.

Referring to FIG. 1, in a system in which a time-based policy is executed, the PS 100 is in a higher level stage than that in which the PEE 300, in which hardware is positioned.

Referring to FIG. 4, a time-based policy is set at the PS 100 through connection to a network service provider (S300).

Thereafter, the PS 100 determines whether an execution time point of the time-based policy arrives based on the set time-based policy (S310).

If an execution time point of the time-based policy does not arrive, the PS 100 continues to determine an execution time point of the time-based policy.

If an execution time point of the time-based policy arrives, the PS 100 converts the time-based policy to PMS transfer syntax (S320).

In this case, step S320 of converting the time-based policy to PMS transfer syntax may be performed earlier than step S310 of determining whether an execution time point of the time-based policy arrives.

That is, the PS 100 may first convert a time-based policy to PMS transfer syntax or may determine an execution time point of a time-based policy while converting the time-based policy to PMS transfer syntax.

Thereafter, when the time-based policy is converted to PMS transfer syntax and an execution time point of the time-based policy arrives, the PS 100 transmits the time-based policy to the PMS 200 (S330).

Thereafter, the PMS 200, having downloaded the time-based policy stores and synchronized the policy (S340), parses the policy to a structure that is appropriate for each PEE 300 (S350), and transmits the policy to the PEE 300 (S360).

The PEE 300, having downloaded the parsed time-based policy, executes the time-based policy (S370).

Through the above process, even in a stage of the PS 100, an execution time point of the time-based policy may be determined.

Even in this case, after an execution time point of the time-based policy is determined, the policy may be executed after some time delay, but by determining an execution time point of the time-based policy in consideration of a time that is parsed to a structure that is appropriate for the PEE 300, a time delay problem can be solved.

According to an exemplary embodiment of the present invention, in a stage of the PS 100 or the PMS 200 of a network system, as an execution time point of the time-based policy is determined, a burden of a hardware-based stage (the PEE 300) can be reduced.

Further, according to an exemplary embodiment of the present invention, as the network service provider adjusts traffic of a network by executing the time-based policy, an application service in which an accounting model and traffic for a specific period are coupled can be provided. When using a policy in which a time condition is combined, the network service provider may intercept a corresponding network user from using a network to exceed limited traffic.

For example, after a mobile phone user pays a predetermined amount of money and contracts to use data traffic of 1 Gbps at a month, when a month has passed from a specific time point or when used data traffic reaches 1 Gbps, a network service provider may intercept data traffic of a corresponding mobile phone user.

Further, according to another exemplary embodiment of the present invention, an application service that intercepts use of a network at a specific time zone may be provided.

For example, while a student is at a school, an application service that enables the student to only use an emergency call and that intercepts traffic that is generated by a text message, mobile Internet, etc., may be provided.

Further, according to another exemplary embodiment of the present invention, various QoS services can be provided according to a specific time zone. When some user uses a specific application service in a specific time zone, a preferential processing service in a network side can be provided to a corresponding user.

In this way, according to an exemplary embodiment of the present invention, when a policy for traffic control is set, as the policy is combined by reflecting a time condition, various policies can be provided and various application services that use the policy can be provided. Further, by enabling each stage of a system that executes a time-based policy to determine an execution time point of the time-based policy, the time-based policy can be efficiently, rapidly, and correctly executed.

According to an exemplary embodiment of the present invention, by reflecting a time condition to policy setting that controls traffic, a policy for efficient operation of a network can be subdivided and diversified.

According to another exemplary embodiment of the present invention, at a software-based step of a system that executes a time-based policy, by determining an execution time point of the time-based policy, a burden of hardware (e.g., policy execution equipment) that substantially controls traffic can be reduced.

According to another exemplary embodiment of the present invention, at the hardware step (e.g., operation step of policy execution equipment) of a system that executes a time-based policy, by determining an execution time point of the time-based policy, an execution time point can be determined at an execution time point of the policy, and thus the time-based policy can be rapidly executed without time delay from a determination time point of execution While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of determining an execution time point of a time-based policy that controls traffic, the method comprising:
- determining, by a policy server (PS) to which the policy is set, whether an execution time point of the policy arrives;
- continuing, if an execution time point of the policy does not arrive, to determine an execution time point of the policy; and
- transmitting, if an execution time point of the policy arrives, the policy to a policy management system (PMS), wherein the PMS is connected to policy execution equipment (PEE) that executes the policy, and wherein the execution time point reflects a time condition that is provided independently from the traffic,
- wherein the time-based policy is set based on tuple information that is included in a packet from the traffic and the time condition by the policy server.

2. The method of claim 1, further comprising converting, by the PS, the policy to PMS transfer syntax and transmitting the PMS transfer syntax to the PMS.

3. A method of determining an execution time point of a time-based policy that controls traffic, the method comprising:
- downloading, by a policy management system (PMS) that is connected to a policy execution equipment (PEE) that executes the policy, the policy;
- storing the policy at a database that is included in the PMS;
- determining whether an execution time point of the policy arrives;
- continuing, if an execution time point of the policy does not arrive, to determine an execution time point of the policy,
- wherein the execution time point reflects a time condition that is provided independently from the traffic,
- wherein the time-based policy is set based on tuple information that is included in a packet from the traffic and the time condition by a policy server.

4. The method of claim 3, further comprising parsing, before the transmitting of the policy to the PEE, by the PMS, the policy to a structure that is appropriate for the PEE.

5. The method of claim 3, further comprising synchronizing a time-based policy that is stored at the PMS with the downloaded policy.

6. A method of executing a time-based policy that controls traffic, the method comprising:
- downloading, by a policy execution equipment (PEE) that executes the policy, the policy;
- determining whether an execution time point of the policy arrives;
- continuing, if an execution time point of the policy does not arrive, to determine an execution time point of the policy, wherein the execution time point reflects a time condition that is provided independently from the traffic; and
- executing, if an execution time point of the policy arrives, the policy, wherein the time-based policy is set based on tuple information that is included in a packet from the traffic and the time condition by a policy server.

* * * * *